(12) United States Patent
Klapatch et al.

(10) Patent No.: US 6,607,354 B1
(45) Date of Patent: Aug. 19, 2003

(54) INDUCTIVE ROTARY JOINT MESSAGE SYSTEM

(75) Inventors: Robert D. Klapatch, Wethersfield, CT (US); Joshua I. Goldberg, Woodbridge, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 0 days.

(21) Appl. No.: 10/102,267

(22) Filed: Mar. 19, 2002

(51) Int. Cl.[7] .............................................. B64C 11/30
(52) U.S. Cl. ............................. 416/1; 416/61; 416/95; 416/155
(58) Field of Search ............................ 416/1, 61, 95, 416/155; 415/118

(56) References Cited

U.S. PATENT DOCUMENTS 3,573,520 A * 4/1971 Dorshimer .................. 310/168
4,026,660 A * 5/1977 Ueda et al. .................. 416/61
4,345,237 A * 8/1982 Lerche et al. ............... 340/946
6,011,325 A   1/2000 Goldberg et al.

* cited by examiner

*Primary Examiner*—Ninh H. Nguyen
(74) *Attorney, Agent, or Firm*—Carlson, Gaskey & Olds

(57) ABSTRACT

A messaging system for a rotating airfoil system is provided that includes a stationary structural member supporting a shaft that is rotatable about an axis. An airfoil assembly is supported by the shaft. A first arcuate coil assembly is supported on the structural member and is arranged at least partially about the shaft. A second arcuate coil assembly is supported on the airfoil assembly adjacent to the first arcuate coil assembly and is rotatable relative thereto. One of the coil assemblies provides a magnetic field having an inductance with an electronic message. The inductance of the one coil assembly produces a voltage containing the message in the other coil assembly. The message may be demodulated from the voltage. In this manner, messages may be sent to and from airfoil assembly systems such as blade heaters and blade pitch actuators.

24 Claims, 3 Drawing Sheets

INDUCTIVE ROTARY JOINT MESSAGE SYSTEM

BACKGROUND OF THE INVENTION

This invention relates to a rotating airfoil system such as a rotor or propeller, and more particularly, the invention relates to a messaging system for transmitting communications between an airframe and the rotating airfoil assembly.

Rotating airfoil systems transmit power from the airframe to the rotating airfoil assembly to provide power to the rotating airfoil assembly systems such as blade pitch angle actuators and blade heaters. In addition to simply powering these systems, it is desirable to selectively control the systems and monitor their status to ensure desired operation. For example, propellers are most efficient when their blade pitch angle is adjusted to accommodate for air speed, altitude, and thrust requirements. When multiple propellers are employed on one airframe, it is also important to match the performance of the propellers to minimize noise and vibration. Additionally, a number of techniques are employed to measure blade pitch angle. The most accurate generally involves sensors mounted on the propeller blades. These devices measure rotation of the blade with respect to the relatively fixed propeller barrel. The expense and difficulty of reliably transmitting this information between the airframe and airfoil assembly presents numerous problems.

As another example, propeller blade heaters are controlled through slip rings to turn the blade heaters on and off to de-ice the airfoil. Reports on system operation of the blade heaters are also transmitted across the slip rings. However, the slip rings are difficult and expensive to maintain and lack the practical ability to provide redundancy due to their size, which is always desirable for critical aircraft systems. To this end, it is desirable to eliminate the slip rings to reduce the maintenance and expense associated therewith. It is also desirable to provide a redundant messaging system that may be used to send and receive messages between the airframe and rotating airfoil assembly.

SUMMARY OF THE INVENTION AND ADVANTAGES

The present invention provides a messaging system for a rotating airfoil system including a stationary structural member supporting a shaft that is rotatable about an axis. An airfoil assembly is supported by the shaft. A first arcuate coil assembly is supported on the structural member and is arranged at least partially about the shaft. A second arcuate coil assembly is supported on the airfoil assembly adjacent to the first arcuate coil assembly and is rotatable relative thereto. One of the coil assemblies provides a magnetic field having an inductance with an electronic message. The inductance of the one coil assembly produces a voltage containing the message in the other coil assembly. The message may be demodulated from the voltage. In this manner, messages may be sent to and from airfoil assembly systems such as blade heaters and blade pitch actuators.

Accordingly, the above invention provides a rotating airfoil system that eliminates the use of slip rings while providing redundant messaging across the airframe and airfoil assembly.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
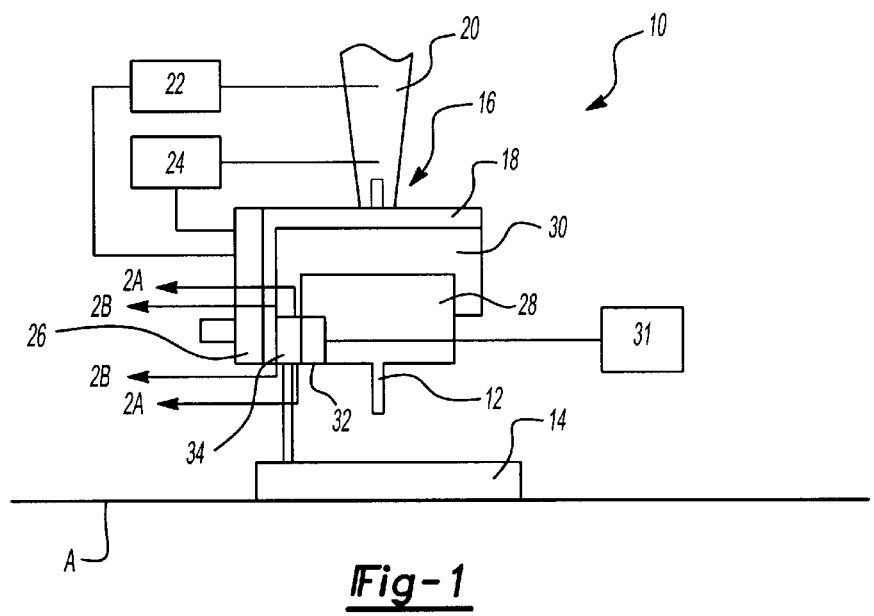
FIG. 1 is a schematic view of a rotating airfoil system of the present invention.

A rotating airfoil system 10 is depicted in a highly schematic manner in FIG. 1. The system 10 includes a stationary structural member, typically a portion of an airframe 12. A shaft 14, which may be a portion of a gear set, is supported by the airframe 12 and is rotatable about an axis A. An airfoil assembly 16 is supported on the shaft 14 includes a housing 18 supporting a plurality of rotating airfoils 20, such as rotor blades or propeller blades. The blades 20 may be manipulated by blade pitch angle actuators 22 to obtain a desired blade position to accommodate for air speed, altitude, and thrust requirements. The airfoil assembly 16 may also include blade heaters 24 on the blades 20 for deicing. Rotating electronics 26 mounted on the airfoil assembly may provide commands to the blade pitch angle actuators 22 and blade heaters 24 and may also monitor their operation to ensure that the commands are properly executed.

The airfoil assembly 16 requires power to operate the blade pitch angle actuators 22 and blade heaters 24. To this end, the stationary structural member 12 may include a permanent magnet 18 that induces a voltage in generator coils 30 supported by the airfoil assembly 16. Messages also must be sent to and from the blade pitch angle actuators 22 and blade heaters 24 across the rotary joint. In the past, slip rings have been employed to provide a physical electrical connection across the joint. However, much expense and maintenance is associated with slip rings. For example, the airfoil assembly must be at least partially disassembled to replace a slip ring. Furthermore, the use of slip rings make it difficult to provide redundancy because of their size.

Figures 2A, 2B:
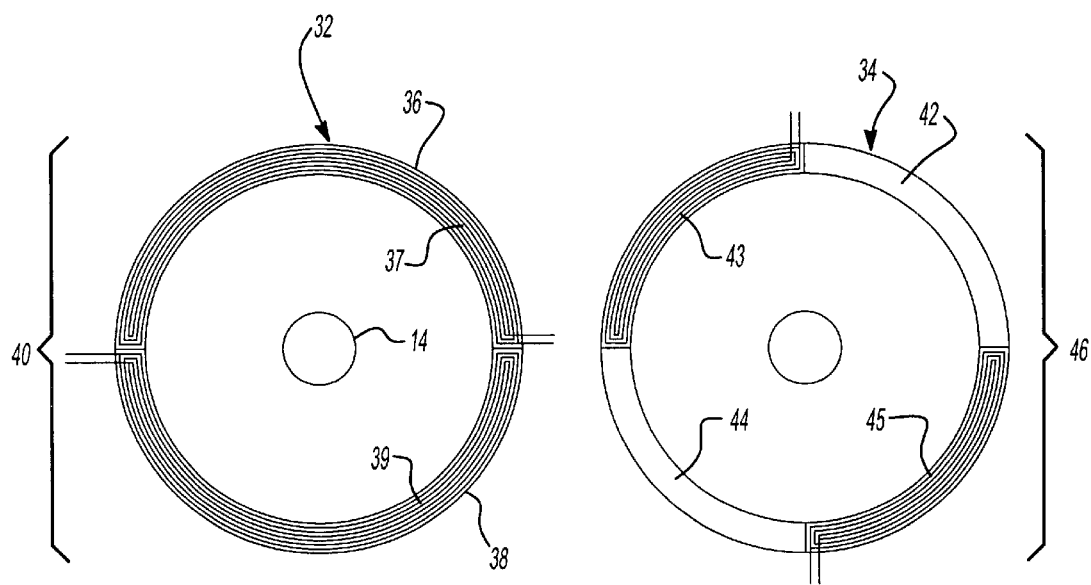
FIG. 2A is a cross-sectional view of a first arcuate coil assembly taken along lines 2A—2A shown in FIG. 1.
FIG. 2B is a cross-sectional view of a second arcuate coil assembly taken along lines 2B—2B of FIG. 1.

Referring to FIG. 2A, the first arcuate coil assembly 32 includes first 36 and second 38 portions that together define a first annular member 40. Each of the portions 36 and 38 may preferably be 180° of the annular member 40 to facilitate installation and removal of the member 40 about the shaft 14 without disassembling the airfoil assembly 16. Each of the portions 36 and 38 may respectively include a first 37 and second 39 coil that may extend approximately 180°. The first coil 37 may be used for a first communications channel and the second coil 39 may be used for a second communications channel to provide redundancy in case one of the channels becomes inoperative. The coils 37 and 39 extend 180°. Referring to FIG. 2B, the second arcuate coil assembly 34 includes first 42 and second 44 portions that together define a second annular member 46.

The portions 42 and 44 may be approximately 180° and facilitate installation and removal of the annular member 46 from the airfoil assembly 16. The first 42 and second 44 portions respectively include first 43 and second 45 coils. The coils 43 and 45 extend 90°. The first coil 43 corresponds to a first communications channel, and the second coil 45 corresponds to a second communications channel to provide redundancy in case one of the coils becomes inoperative.

As shown in FIG. 1, the second annular member 46 may be spaced axially from the first annular member 40. However, it is to be understood that the members also may be spaced from one another radially. The size of the coils is simply a function of the desired number of redundant channels and the desire to provide a multi-pieced annular member to facilitate maintenance. That is, the rotating coils need not extend 90°, and the stationary coils need not extend 180°.

Figure 3:
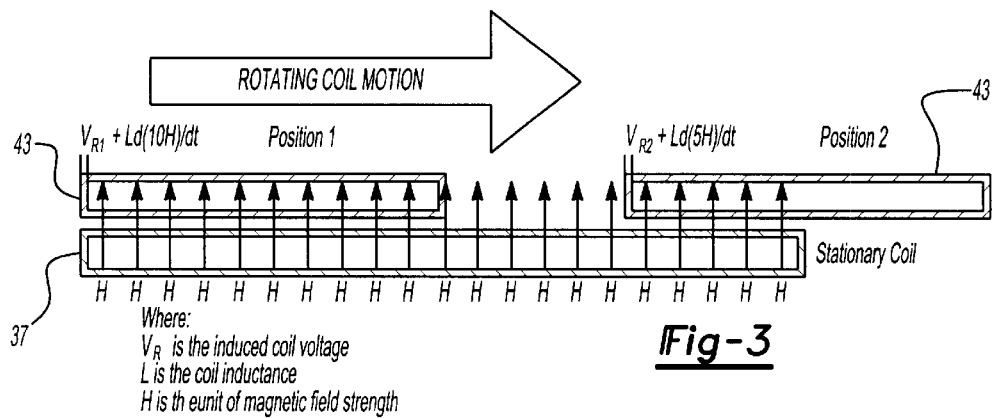
FIG. 3 depicts a voltage induced in the rotating coil assembly from the stationary coil assembly in a first and second position.

In operation, to send a message from the airframe 12 to the airfoil assembly 16 a request signal is generated in the stationary electronics 31 (FIG. 1), which manifests itself as a voltage in either the first coil 37 or the second coil 39 or both. The voltage in the coil creates a magnetic field providing an inductance that induces a voltage in the first 43 and second 45 coils as they pass over the charged coil or coils in the first annular member 40. The voltage induced in the rotating coil is approximately proportional to the percentage of overlap, as illustrated in FIG. 3. The arrangement depicted in FIGS. 2A and 2B allow communications to continue even though the overlap is not 100% if the signal strength need not be 100% to provide a usable signal. For most electronic designs a signal strength of 50% is very adequate to provide reliable messages. Thus, when the rotating coil is −45° to +45° beyond the stationary coil, messages can be sent and received across the inductive coupler. The voltage containing the message is received by the rotating electronics 26 where the signal is demodulated to discern the request sent by the stationary electronics 31. It is to be understood that the term demodulated simply means that the message is pulled or filtered from the carrier signal, which may be digital or analog. The message is then sent as a command to such systems as the blade pitch angle actuator 22 or blade heater 24.

In a similar manner, messages may be sent from the airfoil assembly 16 to the airframe 12. For example, systems such as the blade pitch angle actuator 22 and blade heater 24 may be monitored to ensure proper operation. System status information may be received by the rotating electronics 26 which creates a voltage across one or both of the coils 43 and 45. The voltage contains a message indicative of the status information. The magnetic field in the rotating coils has an inductance that induces a voltage in the stationary coil. The voltage of the stationary coil contains the message which is received by the stationary electronics 31. The stationary electronics 31 demodulates the signal to discern the message to determine whether the airfoil assembly systems are operating as desired.

Figure 4:
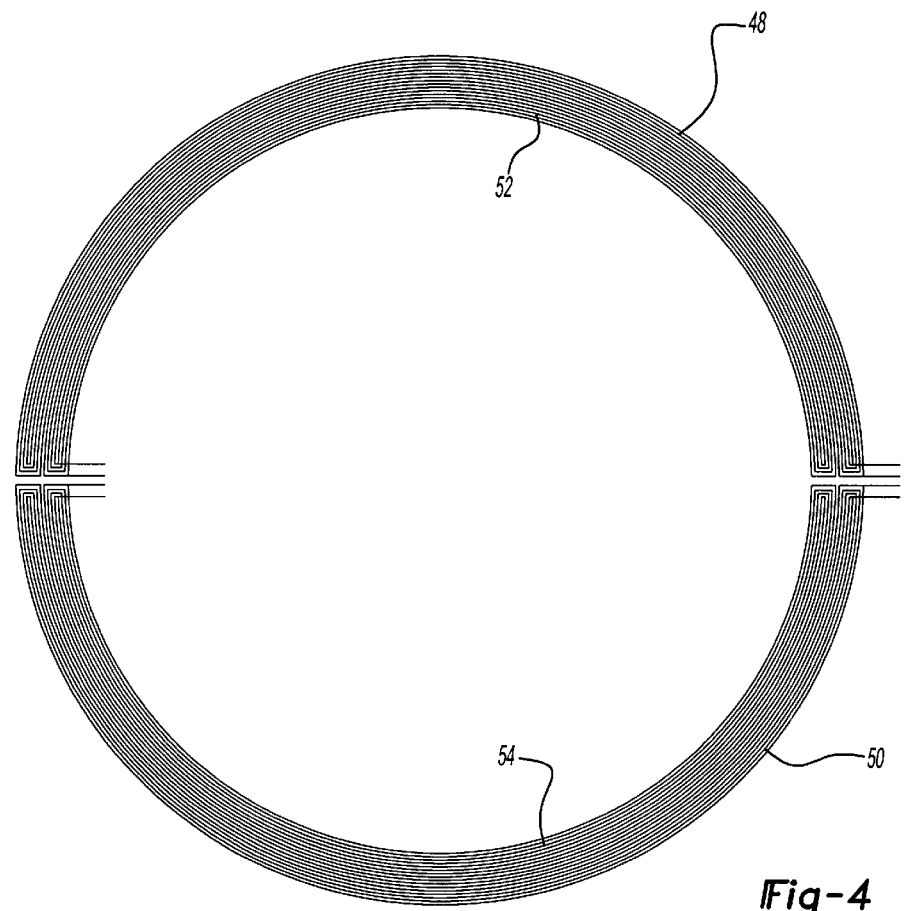
FIG. 4 is a view of another arcuate coil assembly of the present invention.
Figure 5A:
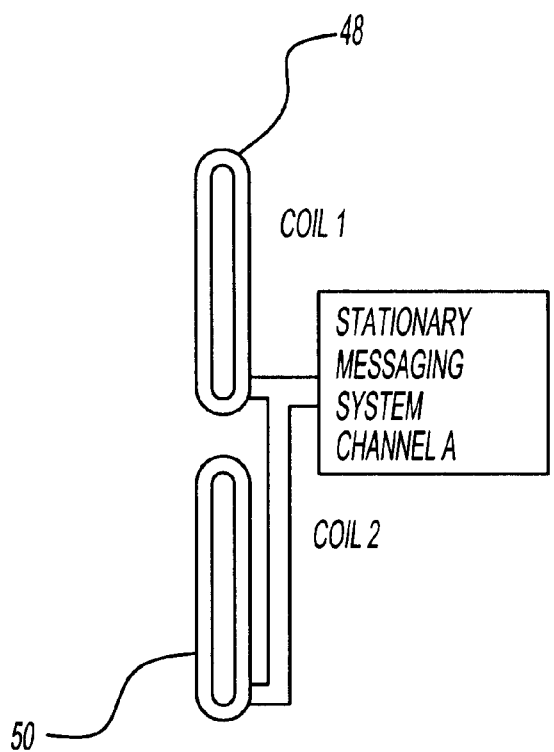
FIG. 5A is a schematic view of coils connected in a series to provide a first communications channel.
Figure 5B:
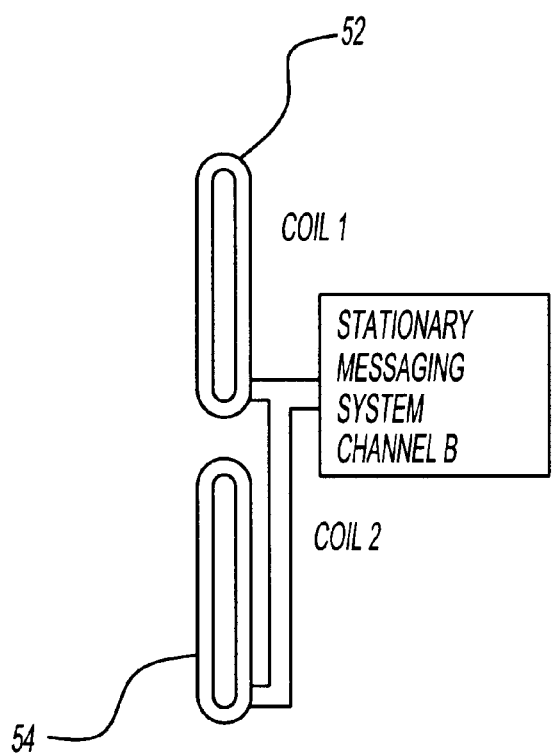
FIG. 5B is a schematic view of other coils connected in series to provide a second communications channel.

The rotating and stationary coils may be arranged in any suitable manner to provide a desired number of redundancies and/or the desired amount of communication over a rotation of the shaft 14. For example, referring to FIGS. 4, 5A and 5B, a stationary coil is depicted having two communication channels of redundancy. A first coil 48 is connected in series with a second coil 50 to provide communication over the full 360° of rotation. Similarly, a first coil 52 is connected in series with the second coil 54 to provide a second channel of communication. The first 52 and second 54 coils are spaced radially inwardly from the first 48 and second 50 coils.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A messaging system for a rotating airfoil system comprising:

a stationary structural member supporting a shaft rotatable about an axis with an airfoil assembly supported by said shaft;

a first arcuate coil assembly supported on said structural member arranged at least partially about said shaft;

a second arcuate coil assembly supported on said airfoil assembly adjacent to said first arcuate coil assembly and rotatable relative thereto;

wherein one of said coil assemblies provides a magnetic field having an inductance with an electronic message producing a voltage containing said message in the other of said coil assemblies.

2. The system according to claim 1, wherein said first coil assembly provides said inductance and said airfoil assembly includes rotating electronics demodulating said voltage to determine said message.

3. The system according to claim 2, wherein said airfoil assembly includes blade pitch actuators with said rotating electronics sending a command to said actuators in response to said message.

4. The system according to claim 2, wherein said airfoil assembly includes blade heaters with said rotating electronics sending a command to said blade heaters in response to said message.

5. The system according to claim 1, wherein said second coil assembly provides said inductance and said airfoil assembly includes rotating electronics provides said message.

6. The system according to claim 5, wherein said message corresponds to blade pitch angle information.

7. The system according to claim 5, wherein said message corresponds to blade heater information.

8. The system according to claim 1, wherein said coil assemblies are spaced axially relative to one another.

9. The system according to claim 1, wherein said first arcuate coil assembly includes first and second separable portions defining a first annular member.

10. The system according to claim 1, wherein said second arcuate coil assembly includes first and second separable portions defining a second annular member.

11. The system according to claim 9, wherein said first portion includes a first coil defining a first communications channel.

12. The system according to claim 11, wherein said second portion includes a second coil defining a second communications channel.

13. The system according to claim 11, wherein said second portion includes a second coil connected in series with said first coil.

14. The system according to claim 11, wherein said first portion includes a second coil spaced radially from said first coil defining a second communications channel.

15. The system according to claim 11, wherein said first coil extends approximately 180 degrees about said axis.

16. The system according to claim 10, wherein said first portion includes a first coil defining a first communications channel.

17. The system according to claim 16, wherein said second portion includes a second coil defining a second communications channel.

18. The system according to claim 16, wherein said first portion includes a second coil spaced radially from said first coil defining a second communications channel.

19. The system according to claim 16, wherein said first coil extends approximately 90 degrees about said axis.

20. A method of sending a message between a stationary member and a rotating airfoil assembly comprising the steps of:
  a) providing a first stationary arcuate coil assembly and a second rotating arcuate coil assembly arranged adjacent to the first coil assembly;
  b) generating a magnetic field having an inductance in one of the coil assemblies with an electronic message;
  c) inducing a voltage in the other of the coil assemblies with the voltage including the message; and
  d) demodulating the voltage to determine the message.

21. The method according to claim 20, wherein the message is blade pitch angle request.

22. The method according to claim 20, wherein the message is a blade heater request.

23. The method according to claim 20, wherein the message is a blade pitch angle system status.

24. The method according to claim 20, wherein the message is a blade heater system status.

* * * * *